US012151785B2

(12) United States Patent
Holmberg

(10) Patent No.: US 12,151,785 B2
(45) Date of Patent: Nov. 26, 2024

(54) METHOD FOR OPERATING WINCH SYSTEM, AND WINCH SYSTEM

(71) Applicant: ABB Schweiz AG, Baden (CH)

(72) Inventor: Mikael Holmberg, Helsinki (FI)

(73) Assignee: ABB Schweiz AG, Baden (CH)

( * ) Notice: Subject to any disclaimer, the term of this patent is extended or adjusted under 35 U.S.C. 154(b) by 825 days.

(21) Appl. No.: 17/241,467

(22) Filed: Apr. 27, 2021

(65) Prior Publication Data

US 2021/0354787 A1 Nov. 18, 2021

(30) Foreign Application Priority Data

May 15, 2020 (EP) .................................... 20174951

(51) Int. Cl.

*B65H 23/198* (2006.01)
*B63B 21/16* (2006.01)
*B65H 59/38* (2006.01)
*B66D 1/50* (2006.01)

(52) U.S. Cl.

CPC .............. *B63B 21/16* (2013.01); *B66D 1/505* (2013.01)

(58) Field of Classification Search

CPC ................................ B63B 21/16; B66D 1/505
USPC .............................................................. 318/6
See application file for complete search history.

(56) References Cited

U.S. PATENT DOCUMENTS 5,997,374 A * 12/1999 Pollack .................. B63B 22/02 441/3
2014/0338581 A1* 11/2014 Gill ........................ B63B 21/58 114/230.21
2016/0159625 A1* 6/2016 Janik ...................... B66D 1/485 700/282
2017/0203940 A1 7/2017 Holmberg et al.

FOREIGN PATENT DOCUMENTS

| | | | |
|---|---|---|---|
| CN | 105730628 | A | 7/2016 |
| CN | 107021185 | A | 8/2017 |
| CN | 105730628 | B | 9/2017 |
| EP | 3032552 | A1 | 6/2016 |
| KR | 1020160048374 | A | 5/2016 |
| RO | 126586 | A2 | 8/2011 |
| SU | 966211 | A2 | 10/1982 |

OTHER PUBLICATIONS

European Search Report; Application No. EP 20 17 4951; Issued: Nov. 20, 2020; 2 Pages.
Chinese Second Office Action and Search Report; Application No. 202110527882.7; Completed: Feb. 2, 2023; Mailed: Feb. 5, 2023; 20 Pages.

* cited by examiner

*Primary Examiner* — Erick D Glass
(74) *Attorney, Agent, or Firm* — Whitmyer IP Group LLC

(57) ABSTRACT

A method for operating a winch system, and an arrangement including at least two electric drives each configured to operate a respective winch including a winch drum to spool a spoolable medium, and an electric motor to rotate the winch drum, each of the winches having an active state, in which the winch drum is driven according to a predeter- (Continued)

mined tension set point value, and a passive state, in which the winch drum is prevented from rotating, wherein, during a mooring of a vessel, the arrangement is configured to operate the at least two winches such that, over a period of time, each of the at least two winches is operated in its active state for a portion of the period, and each of the at least two winches is operated in its passive state for a portion of the period.

10 Claims, 3 Drawing Sheets

METHOD FOR OPERATING WINCH SYSTEM, AND WINCH SYSTEM

TECHNICAL FIELD

The present invention relates to a method for operating a winch system, and to a winch system.

BACKGROUND

Winches can be used for mooring a vessel such as a ship, a boat or generally a craft designed for water transportation, for example.

Such a winch used for the mooring may comprise a rotatable winch drum, and may be used for spooling a spoolable medium, which may be connected to a point of mooring. The spoolable medium may comprise a cable, a rope, a wire or a chain, for example. The point of mooring may be any point where the vessel can be moored, such as a mooring-post of a vessel landing place, e.g. a port or a pier, or an anchor or a buoy, for example. The winch used for the mooring may further comprise an electric motor, which is configured to rotate the winch drum during spooling in or spooling out of the spoolable medium, for example.

In a vessel, the mooring functionality of the winch used for the mooring can control the spoolable medium that holds the vessel in place at the point of mooring by means of the electric motor. When the vessel is being moored, the tension of the spoolable medium between the vessel and the point of mooring can be automatically adjusted by suitably controlling the electric motor of the winch used for mooring. The tension of the spoolable medium between the vessel and a point of mooring is preferably kept at an appropriate level. If the spoolable medium between the vessel and the point of mooring is too loose, the vessel may not stay in place, and if the spoolable medium is too tight, the spoolable medium might break or the operation might become unstable, for instance.

The electric motor of the winch can be controlled such that when the tension of the spoolable medium between the vessel and the point of mooring differs from a predetermined tension set point, which may be e.g. a single value or value range, the spoolable medium is either tightened (spooled in) or loosened (spooled out) towards the predetermined tension set point. And when the predetermined tension set point is reached, the tightening or loosening may be stopped either immediately or after a predetermined delay, for example. Thus, the winch may actively continuously monitor the tension of the spoolable medium between the vessel and the point of mooring and adjust it whenever it differs from the predetermined tension set point. A winch system for a vessel may comprise a plurality of such winches of which two or more winches may be used simultaneously actively for the mooring. In such a system, individual winches may each carry out the mooring in a stand-alone manner.

A problem related to the above solution is that in such a winch system comprising a plurality of winches, the stress and wear caused by the mooring operation to the winches may be distributed considerably unevenly between the individual winches.

BRIEF DESCRIPTION

An object of the present invention is thus to provide a method and an apparatus for implementing the method so as to solve the above problem or at least alleviate the above problem. The object of the invention are achieved by a method, a computer program product, an arrangement, and a winch system, which are characterized by what is stated in the independent claims. The preferred embodiments of the invention are disclosed in the dependent claims.

The invention is based on the idea of operating at least two winches for the mooring of the vessel such that, over a period of time, each of the at least two winches is operated in its active state for a portion of the period of time, and such that, over the same period of time, each of the at least two winches is operated in its non-active, i.e. passive, state for a portion of the period of time.

An advantage of the solution of the invention is that the stress and wear caused by the mooring operation to the winches may be distributed more evenly between individual winches, which may extend the lifetime of the winches or components thereof.

BRIEF DESCRIPTION OF THE DRAWINGS

In the following the invention will be described in greater detail by means of preferred embodiments with reference to the accompanying drawings, in which.

DETAILED DESCRIPTION

Figure 1:
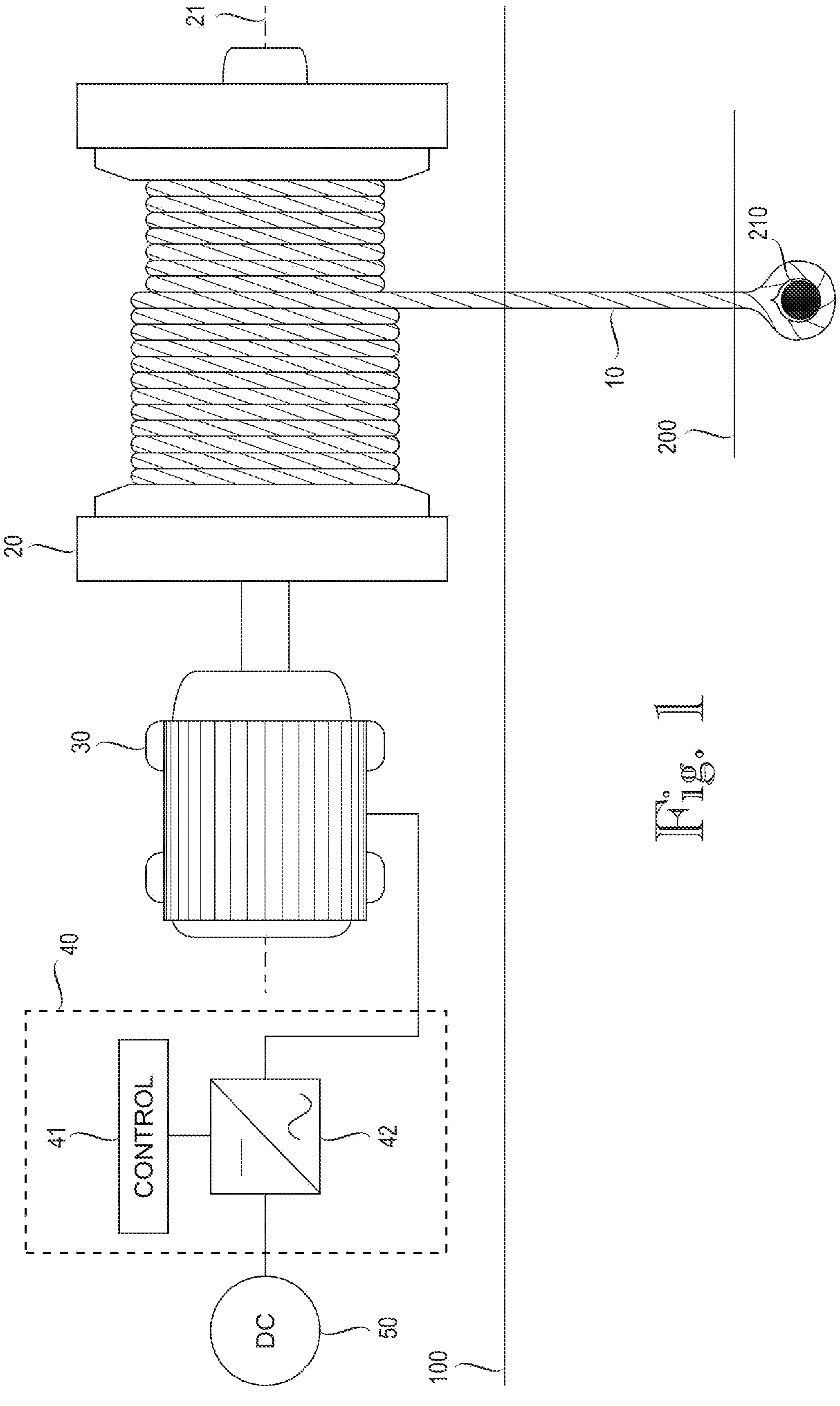
FIG. 1 illustrates a winch arrangement according to an embodiment.

FIG. 1 illustrates a simplified diagram of a winch arrangement according to an embodiment. The exemplary winch arrangement of FIG. 1 can be used for mooring a vessel, for example. Such a vessel may be a ship, a boat or generally a craft designed for water transportation in a sea, an ocean, a lake, a river, a channel, a canal, or any parts thereof, for example. The figure only shows components necessary for understanding the various embodiments. The exemplary winch arrangement comprises a winch comprising a winch drum 20 for spooling a spoolable medium 10, which winch drum is rotatable about an axis of rotation 21. The spoolable medium 10 may comprise a cable, a rope, a wire, a chain or any combination thereof, for example. In the example of FIG. 1, the winch further comprises an electric motor 30, which is operably coupled to the winch drum 20 such that the winch drum can be rotated with the electric motor 30. The electric motor 30 may be connected to the winch drum 20 directly or via one or more other components or devices, such as a gearbox (not shown in the figure). The exemplary electric motor 30 driving the winch drum 20 can be of any type, such as an asynchronous AC motor, e.g. an induction motor, a synchronous AC motor or a DC motor. Possible examples of the synchronous AC motor include non-excited motors, such as a reluctance motor, a hysteresis motor and a permanent magnet motor, and DC-excited motors, for example. It should be noted that the use of the embodiments described herein is not limited to systems employing any specific fundamental frequency or any specific voltage level, for example.

The exemplary winch of FIG. 1 further comprises an electric drive 40. Term 'electric drive' herein generally refers to an electronic apparatus, which may be used to regulate the performance of an electric motor. An electric drive may control the power, frequency and/or current supplied to the motor, for instance. An electric drive and an electric motor controlled by the electric drive may form an electric drive system. An electric drive may comprise one or more electric power converter units or modules, such as rectifiers, inverters or frequency converters, for example. In the example of FIG. 1, the electric drive comprises an inverter 42 and a control arrangement 41, for feeding the electric motor 30 from a DC power supply 50. Herein term 'inverter' generally refers to an electronic device or circuitry that is able to convert direct current to alternating current. An example of the inverter is a semiconductor bridge implemented by means of controllable semiconductor switches, such as IGBTs (Insulated-Gate Bipolar Transistor) or FETs (Field-Effect Transistor), which are controlled according to a modulation or control scheme used. The control of the electric motor 30 may be implemented by means of the electric drive 40 in such a manner that the motor 30 implements a desired speed and/or torque instruction, for example. Examples of control methods for electric drives include frequency control, flux vector control and direct torque control, for example. The exemplary electric drive 40 could also comprise a frequency converter, for instance. The exemplary control arrangement 41 of the electric drive 40 may be used to control the electric drive and components thereof, e.g. the inverter 42, and consequently, the electric motor 30, and the operation of the winch. The control arrangement 41 may be a separate unit or a part of the inverter 42 or some other unit, for example. The control arrangement 41 may comprise suitable I/O (Input-Output) means, such as a keyboard and display unit or another separate terminal unit, which may be connected to the control arrangement 41 in a wired and/or wireless manner. Thus, an operator or a user of the winch arrangement can operate the winch through such I/O means, for instance. The electric drive 40 may be physically located apart from the respective electric motor 30 and winch drum 20.

FIG. 1 further illustrates a fixing point 210 for the spoolable medium 10, wherein the end of the spoolable medium 10 is to be fixed to the fixing point 210 during the mooring of the vessel, for example. According to an embodiment, the winch 20, 30, 40 may be used for the mooring of the vessel and can be located in the vessel 100 as illustrated in the example of FIG. 1. In the exemplary case the fixing point 210 for the spoolable medium 10 is located at the point of mooring 200. The point of mooring 200 may be a mooring-post of a vessel landing place, such as a port or a pier, or an anchor or a buoy, for example. According to an alternative embodiment, the winch may be used for mooring the vessel and can be located in the point of mooring, i.e. outside of the vessel to be moored. In that case the fixing point 210 for the spoolable medium 10 could be located in the vessel 100 and the exemplary winch 20, 30, 40 could be located within the point of mooring 200, for instance.

According to an embodiment, the winch 20, 30, 40 may have an active state, in which the winch drum 20 of the winch is driven according to a predetermined tension set point value or value range and a monitored tension of the spoolable medium 10 between the vessel and a point of mooring, and a passive state, in which the winch drum 20 is prevented from rotating.

According to an embodiment, in the active state of the winch the winch drum 20 may be driven such that the tension of the spoolable medium 10 between the vessel and the point of mooring reaches the predetermined tension set point value or the predetermined tension set point value range and/or such that the tension of the spoolable medium 10 between the vessel and the point of mooring is maintained at the predetermined tension set point value or within the predetermined tension set point value range, for example. According to an embodiment, the tension of the spoolable medium 10 may be monitored essentially continuously during the operation of the winch, at least in the active state of the winch. According to an embodiment, the tension of the spoolable medium 10 can be monitored by monitoring a torque of the electric motor 30 or a quantity indicative of the torque of the electric motor 30. According to an embodiment, the torque of the electric motor 30 can be monitored by monitoring a current of the electric motor. It also possible to monitor the tension of the spoolable medium 10 by utilizing some other quantity or quantities indicative of the tension of the spoolable medium 10. The monitoring of the tension of the spoolable medium 10 can be performed by the electric drive 40, e.g. by the control unit 41 thereof, or some other possible separate device or system. The winch drum 20 may then be driven by means of the electric motor 30 controlled by the electric drive 40 such that the monitored tension of the spoolable medium 10 reaches the predetermined tension set point value or value range, and, in response to the monitored tension of the spoolable medium 10 reaching the predetermined tension set point value or value range, the driving speed of the electric motor 30 may be set to zero. The torque of the electric motor 30 may then be kept essentially constant such that the monitored tension of the spoolable medium 10 maintains the predetermined tension set point value or it is maintained within the predetermined tension set point value range, for instance.

According to an embodiment, in the passive state of the winch the winch drum 20 may be prevented from rotating by the electric motor 30. According to an embodiment, the winch may comprise a brake for braking the winch drum 20. Then, according to an embodiment, in the passive state of the winch the winch drum 20 may, either alternatively or additionally, be prevented from rotating by the brake. According to an embodiment, in the passive state of the winch the winch drum 20 may be permanently prevented from rotating for the duration of the passive state. However, even in this case the winch drum 20 may be able to rotate if the maximum capacity of the electric motor 30 and/or the brake for braking the winch drum 20 is exceeded.

According to an embodiment, a winch system for mooring a vessel and comprising a plurality of winches may be operated, during the mooring of the vessel such that at least two winches of said plurality of winches are operated for the mooring of the vessel. Thus, only a portion of the plurality of winches of such a winch system may be utilized for the mooring at a time. According to an embodiment, such operating of the at least two winches during the mooring of the vessel may comprise operating, over a period of time, each of the at least two winches in its active state for a portion of the period of time, and operating, over the same period of time, each of the at least two winches in its passive state for a portion of the period of time. Consequently, each of the at least two winches, which are utilized in the mooring, will be both in its active state and in its passive state during said period of time. According to an embodiment, at any given time during said period of time, at least one of said at least two winches is operated in its active state. Consequently, according to this embodiment, at least one of the at least two winches utilized in the mooring is always in its active state during the period of time. The period of time may be predetermined and may be of fixed length or of variable length. The period of time may be from 1 to 60 seconds, from 1 to 60 minutes, from 1 to 24 hours, or one or more days, for example. According to an embodiment, such operating of the at least two winches may be repeated continuously during the mooring of the vessel over two or more consecutive time periods. Such two or more consecutive time periods may of the same length or of different lengths. According to an embodiment, such operating of the at least two winches may be repeated continuously during the mooring of the vessel over two or more consecutive time periods such that it continues at all times during the mooring or at least a portion thereof. As an example, the mooring of the vessel could comprise an initial stage in which the winches used for the mooring are controlled, manually or automatically, in order to preset the lengths and/or tensions of the spoolable mediums of these winches, for instance. During such possible initial stage, the operation of the winches could be at least partly simultaneous, for example. Then, the described operating of the at least two winches over said one or more time periods may be started after such possible initial stage, for instance. And after starting the described operating of the at least two winches over said one or more time periods, it may continue until the end of the mooring or until other kind of winch control is desired or required, for example. According to an embodiment, during said period of time, said at least two winches are operated by turns according to a predetermined sequence. Consequently, according to this embodiment, the at least two winches utilized in the mooring may be operated by turns according to a predetermined sequence e.g. such that each of the at least two winches have their individual turn during which they are operated in their active state, or such that predetermined groups of winches, out of said at least two winches utilized in the mooring, have group-specific turns during which they are operated in their active states, for example. According to an embodiment, a duration of such winch-specific turns and/or winch group specific turns may be the same for all the winches or winch groups or such winch-specific turns and/or winch group specific turns may have different durations. The durations could be predetermined according to winch characteristics, for example. According to an embodiment, the predetermined sequence may be repeated in consecutive periods of time. It is also possible to change the predetermined sequence between consecutive periods of time.

Figure 2:
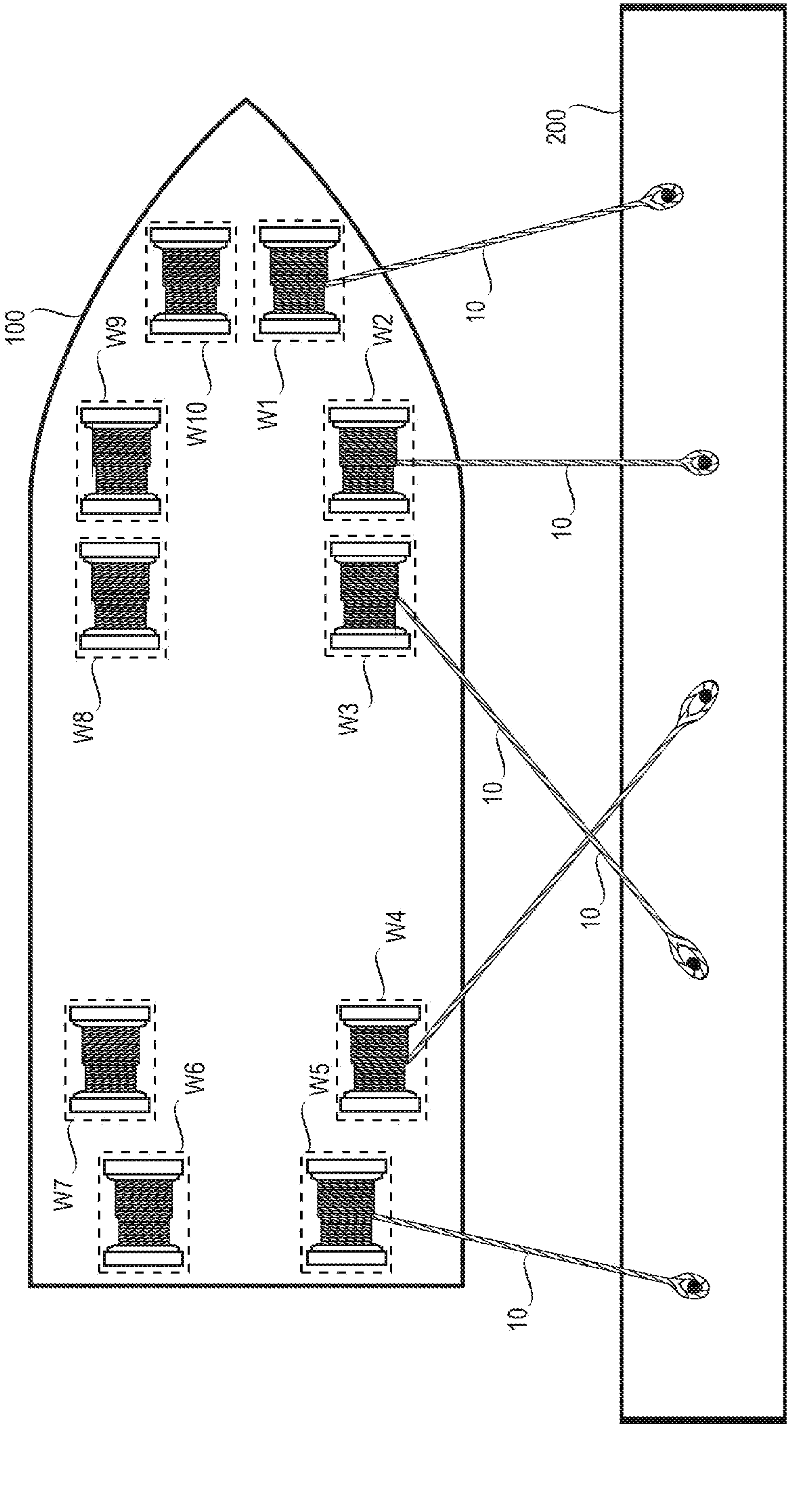
FIG. 2 illustrates a winch system according to an embodiment.

FIG. 2 illustrates an example of a winch system according to an embodiment. The exemplary winch system comprises ten winches W1 to W10 in a vessel 100. The number of winches W1 to W10 could vary from the example. For the sake of clarity, in the exemplary FIG. 2 the winches W1 to W10 are represented by the respective locations of the winch drums of the winches W1 to W10 within the vessel 100. At least some other winch elements of the winches W1 to W10 could be physically located apart from the locations of the winch drums and are thus not illustrated in the figure. In the example the winch drums of winches W1, W2, W3, W4, and W5 are installed on the starboard side, i.e. the right side, of the vessel 100, and winch drums of winches W6, W7, W8, W9, and W10 are installed on the port side, i.e. the left side, of the vessel 100. Moreover, in the example, the winch drums of winches W1 and W10 are closest to the fore of the vessel 100, and the winch drums of winches W5 and W6 are closest to the aft of the vessel 100. In the example of FIG. 2 the vessel 100 is being moored to the point of mooring 200 by using winches W1, W2, W3, W4, and W5 of the winch system. There could be further winches, such as spring winches (not shown in the figure), used additionally for the mooring. Winches W6 to W10 of the winch system are not utilized for the mooring in the exemplary situation. According to an embodiment, during the mooring of the vessel 100 and over a period of time, each of the winches W1 to W5 is operated in its active state for a portion of the period of time, and in its passive state for another portion of the period of time. As an example, if the period of time is t, then the winches W1 to W5 used in the mooring may be operated in their active state one after another over period t. This could be implemented e.g. such that first winch W1 is operated in its active state for a length of time t/5, while winches W2, W3, W4 and W5 are operated in their passive states. Then winch W2 is operated in its active state for a length of time t/5, while winches W1, W3, W4 and W5 are operated in their passive states. After that winch W3 is operated in its active state for a length of time t/5, while winches W1, W2, W4 and W5 are operated in their passive states. After that winch W4 is operated in its active state for a length of time t/5, while winches W1, W1, W3 and W5 are operated in their passive states. Finally, winch W5 is operated in its active state for a length of time t/5, while winches W1, W2, W3, and W4 are operated in their passive states. Consequently, during period t, i.e. t/5+t/5+t/5+t/5+t/5, each of the winches W1 to W5 used in the mooring have been operated in their active state a portion (t/5) of period t and each of the winches W1 to W5 used in the mooring have been operated in their passive state a portion (4*t/5) of period t. After that the same sequence may be repeated again starting from winch W1. It is also possible to change the order of the winches in the sequence and/or to operate the winches W1 to W5 used in the mooring in their active states in groups of e.g. two or three winches.

Figure 3:
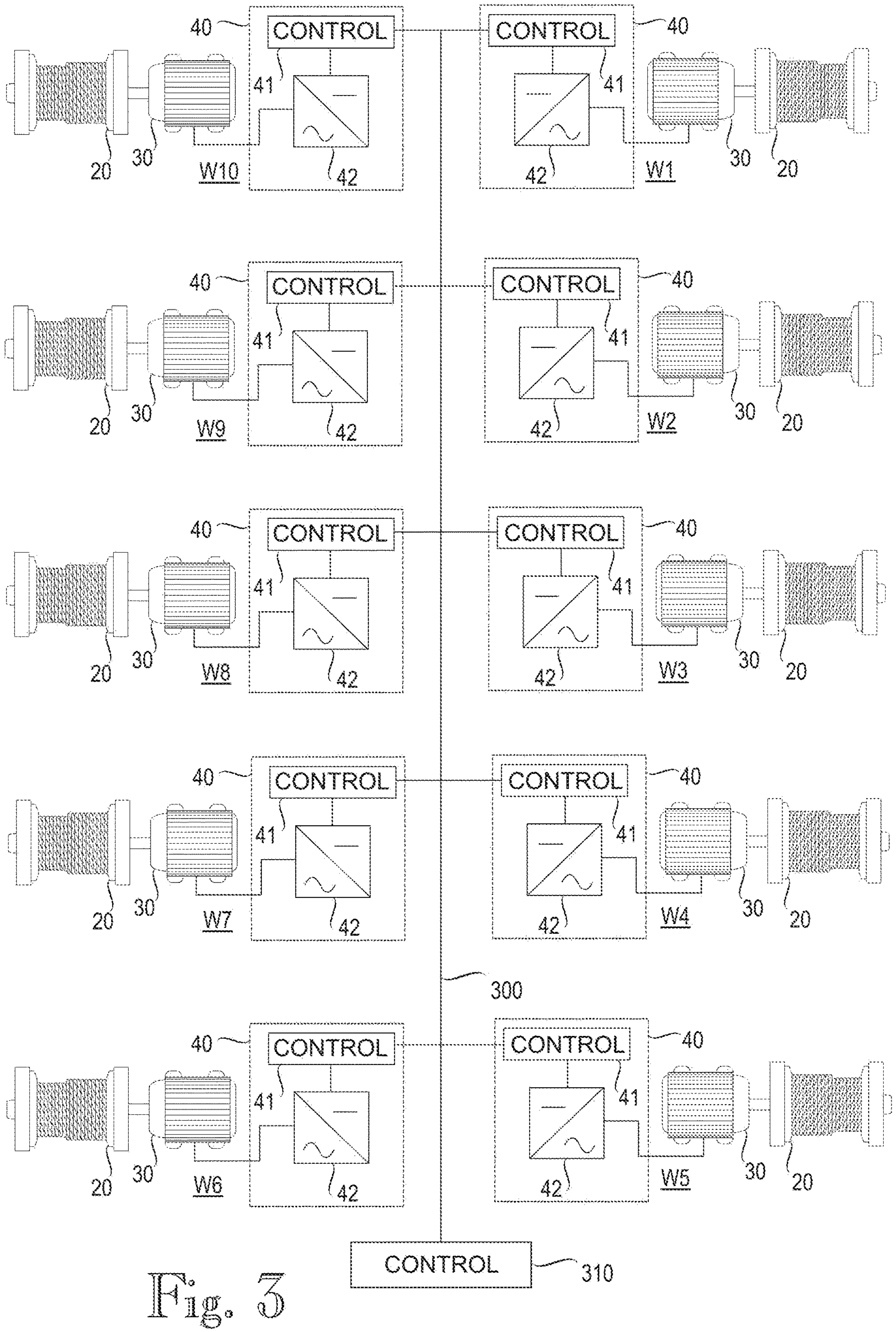
FIG. 3 illustrates a winch system according to an embodiment.

According to an embodiment, the control of the coordination of the operation of the winches according to any one of the embodiments described may be implemented in a centralized manner, in a distributed manner or in a combination thereof. If the control of the coordination of the operation of the winches is implemented in a centralized manner, one of the winches of the winch system may act as a master unit and coordinate the operation of the rest of the winches acting as slave units. However, even in this case the individual winches may control their own operation. Alternatively or additionally, there may be a further controlling entity apart from the winches controlling the coordination of the operation of the winches, for example. FIG. 3 illustrates an example of a winch system according to an embodiment. The exemplary winch system comprises ten winches W1 to W10. The number of the winches in the winch system could vary, however. In the example the electric drives 40, or more specifically the control units 41 thereof, are connected together by network 300 to enable the control and mutual coordination of the operation of the winches according to any one of the embodiments described. The form of such a network 300 may differ from the illustrated example. Network 300 could be a wired network, a wireless network, or a combination thereof, for example. Communication between the electric drives 40 of the winches W1 to W10 could be based on any suitable protocol such as any fieldbus protocol. The example of FIG. 3 further shows an additional control unit 310. The additional control unit 310 could control the coordination of the operation of the winches W1 to W10 according to any one of the embodiments described. Alternatively, one of the control units of the W1 to W10 could control the coordination of the operation of the winches W1 to W10 according to any one of the embodiments described, for instance. If the control of the coordination of the operation of the winches is implemented in a distributed manner, two or more of the winches of the winch system may participate in the coordination of the control of the operation of the operation of the winches in a distributed manner. According to an embodiment, the control responsibility of the coordination of the winches of the winch system could be transferred from one winch to another e.g.

such that always the winch operating in its active state has the coordination responsibility, which is then passed to the next winch which will be operating in its active state next. As an example, if a plurality of winches are used in the mooring one by one (or group by group) in turns, during which turn the winch is operated in its active state, this may be implemented such that the winch, which is in turn of operating in its active state, upon or after ending its turn always enables the next winch in the turn sequence to start its own turn. The winch in turn may perform the enabling of the next winch by suitable signalling via the network 300 between the winches, for example. This way the turn of operating in the active state may be passed from one winch to another according to the predetermined sequence. An apparatus implementing any of the control functions according to any one of the embodiments described above, or a combination thereof, may be implemented as one unit or as two or more separate units that are configured to implement the functionality of the various embodiments. Here the term ‘unit’ refers generally to a physical or logical entity, such as a physical device or a part thereof or a software routine. One or more of these units, such as the control unit 41, may reside in the electric drive 40 or a component thereof, such as the inverter 42, for example. A possible separate control unit 310 may be located separately, for instance.

Any apparatus, such as the control units 41, 310, according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations and a central processing unit (CPU), such as a general-purpose digital signal processor. The CPU may comprise a set of registers, an arithmetic logic unit, and a CPU control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system, which may provide system services to a computer program written with the program instructions. The computer or other apparatus implementing any of the embodiments, or a part thereof, may further comprise suitable input means for receiving e.g. measurement and/or control data, and output means for outputting e.g. control data. It is also possible to use a specific integrated circuit or circuits, or discrete electric components and devices for implementing the functionality according to any one of the embodiments.

Any one of the embodiments described herein, or any combination thereof, can be implemented in existing system elements, such as electric drives or components thereof, such as inverters or frequency converters, or similar devices, or by using separate dedicated elements or devices in a centralized or distributed manner. Present devices for electric drives, such as inverters and frequency converters, may comprise processors and memory that can be utilized in the functions according to embodiments described. Thus, at least some modifications and configurations required for implementing an embodiment e.g. in existing devices may be performed as software routines, which may be implemented as added or updated software routines. If the functionality of an embodiment is implemented by software, such software can be provided as a computer program product comprising computer program code which, when run on a computer, causes the computer or corresponding arrangement to perform the functionality according to any one of the embodiments as described above. Such a computer program code may be stored or generally embodied on a computer readable medium, such as suitable memory, e.g. a flash memory or a disc memory from which it is loadable to the unit or units executing the program code. In addition, such a computer program code implementing an embodiment may be loaded to the unit or units executing the computer program code via a suitable data network, for example, and it may replace or update a possibly existing program code.

It will be obvious to a person skilled in the art that, as the technology advances, the inventive concept can be implemented in various ways. The invention and its embodiments are not limited to the examples described above but may vary within the scope of the claims.

The invention claimed is:

1. A method for operating a winch system for mooring a vessel, the winch system comprising a plurality of winches each including a rotatable winch drum for spooling a spoolable medium for mooring the vessel, an electric motor operably coupled to the winch drum to rotate the winch drum, and an electric drive operably coupled to the electric motor to control the electric motor, wherein each of the winches has an active state, in which the winch drum of the winch is driven according to a predetermined tension set point value or value range and a monitored tension of the spoolable medium between the vessel and a point of mooring, and a passive state, in which the winch drum is prevented from rotating, the method comprising, during a mooring of the vessel:

operating at least two winches of said plurality of winches for the mooring of the vessel, including:

operating, over a period of time, each of the at least two winches in its active state for a portion of the period of time; and operating, over the same period of time, each of the at least two winches in its passive state for another portion of the period of time;

wherein, at any given time during said period of time, at least one of the at least two winches is operated in its active state, wherein the method comprises, during said period of time, operating said at least two winches by turns according to a predetermined sequence, and wherein, during the mooring of the vessel, said operating of the at least two winches for the mooring of the vessel is repeated continuously over two or more consecutive time periods.

2. The method of claim 1, wherein in the active state of the winch the winch drum of the winch is driven such that the tension of the spoolable medium between the vessel and the point of mooring reaches the predetermined tension set point value or the predetermined tension set point value range and/or such that the tension of the spoolable medium between the vessel and the point of mooring is maintained at the predetermined tension set point value or within the predetermined tension set point value range.

3. The method of claim 2, wherein in the passive state of the winch the winch drum of the winch is prevented from rotating by the electric motor.

4. The method of claim 1, wherein each of the at least two winches includes a brake for braking the winch drum, wherein in the passive state of the winch the winch drum of the winch is prevented from rotating by the brake.

5. A computer program product comprising computer program code embodied on a non-transitory computer readable medium, wherein execution of the program code in a computer configured to control a winch system including a plurality of winches each including a rotatable winch drum for spooling a spoolable medium for mooring a vessel, an electric motor operably coupled to the winch drum to rotate the winch drum, and an electric drive operably coupled to the electric motor to control the electric motor, wherein each of the winches has an active state, in which the winch drum of the winch is driven according to a predetermined tension set point value or value range and a monitored tension of the spoolable medium between the vessel and a point of mooring, and a passive state, in which the winch drum is prevented from rotating causes the computer to carry out the steps of:

operating at least two winches of said plurality of winches for the mooring of the vessel, including:

operating, over a period of time, each of the at least two winches in its active state for a portion of the period of time; and operating, over the same period of time, each of the at least two winches in its passive state for another portion of the period of time, wherein, at any given time during said period of time, at least one of the at least two winches is operated in its active state, wherein, during said period of time, operating said at least two winches by turns according to a predetermined sequence, and wherein, during the mooring of the vessel, said operating of the at least two winches for the mooring of the vessel is repealed continuously over two or more consecutive time periods.

6. An arrangement comprising:

at least two electric drives each configured to operate a respective winch including a rotatable winch drum configured to spool a spoolable medium for mooring a vessel, and an electric motor operably coupled to the winch drum to rotate the winch drum, wherein each of the winches has an active state, in which the winch drum is driven according to a predetermined tension set point value or value range and a monitored tension of the spoolable medium between the vessel and a point of mooring, and a passive state, in which the winch drum is prevented from rotating, wherein, during a mooring of the vessel, the arrangement is configured to operate the respective at least two winches for the mooring of the vessel such that, over a period of time, each of the at least two winches is operated in its active state for a portion of the period of time, and such that, over the same period of time, each of the at least two winches is operated in its passive state for another portion of the period of time, wherein the arrangement is configured to, at any given time during said period of time, operate at least one of the at least two winches in its active state, wherein the arrangement is configured to, during said period of time, operate said at least two winches by turns according to a predetermined sequence, and wherein the arrangement is configured to, during the mooring of the vessel, repeat said operation of the at least two winches for the mooring of the vessel continuously over two or more consecutive time periods.

7. The arrangement of claim 6, wherein in the active state of the winch the winch drum of the winch is driven such that the tension of the spoolable medium between the vessel and the point of mooring reaches the predetermined tension set point value or the predetermined tension set point value range and/or such that the tension of the spoolable medium between the vessel and the point of mooring is maintained at the predetermined tension set point value or within the predetermined tension set point value range.

8. The arrangement of claim 6, wherein each of the at least two electric drives comprises an inverter.

9. A winch system comprising:

an arrangement comprising:

at least two electric drives each configured to operate a respective winch including a rotatable winch drum configured to spool a spoolable medium for mooring a vessel, and an electric motor operably coupled to the winch drum to rotate the winch drum, wherein each of the winches has an active state, in which the winch drum is driven according to a predetermined tension set point value or value range and a monitored tension of the spoolable medium between the vessel and a point of mooring, and a passive state, in which the winch drum is prevented from rotating, wherein, during a mooring of the vessel, the arrangement is configured to operate the respective at least two winches for the mooring of the vessel such that, over a period of time, each of the at least two winches is operated in its active state for a portion of the period of time, and such that, over the same period of time, each of the at least two winches is operated in its passive state for another portion of the period of time, wherein, the arrangement is configured to, at any given time during said period of time, operate at least one of the at least two winches in its active state, wherein the arrangement is configured to, during said period of time, operate said at least two winches by turns according to a predetermined sequence, and wherein the arrangement is configured to, during the mooring of the vessel, repeat said operation of the at least two winches for the mooring of the vessel continuously over two or more consecutive time periods; and for each of the at least two electric drives, a rotatable winch drum for spooling a spoolable medium for mooring the vessel, and an electric motor operably coupled to the winch drum to rotate the winch drum, wherein each of the at least two electric drives is operably coupled to the respective electric motor to control the electric motor.

10. An arrangement comprising:

at least two electric drives each configured to operate a respective winch comprising a rotatable winch drum configured to spool a spoolable medium for mooring a vessel, and an electric motor operably coupled to the winch drum to rotate the winch drum, wherein each of the winches has an active state, in which the winch drum is driven according to a predetermined tension set point value or value range and a monitored tension of the spoolable medium between the vessel and a point of mooring, and a passive state, in which the winch drum is prevented from rotating, and a processor, and a memory storing instructions that, when executed by the processor, cause the processor;

during a mooring of the vessel and over a period of time, to operate the at least two winches for the mooring of the vessel such that each of the at least two winches is operated in its active state for a portion of the period of time, and such that, over the same period of time, each of the at least two winches is operated in its passive state for another portion of the period of time, wherein, at any given time during said period of time, at least one of the at least two winches is operated in its active state; and during said period of time, to operate said at least two winches by turns according to a predetermined sequence;

wherein, during the mooring of the vessel, said operating of the at least two winches for the mooring of the vessel is repeated continuously over two or more consecutive time periods.

* * * * *